2,813,897

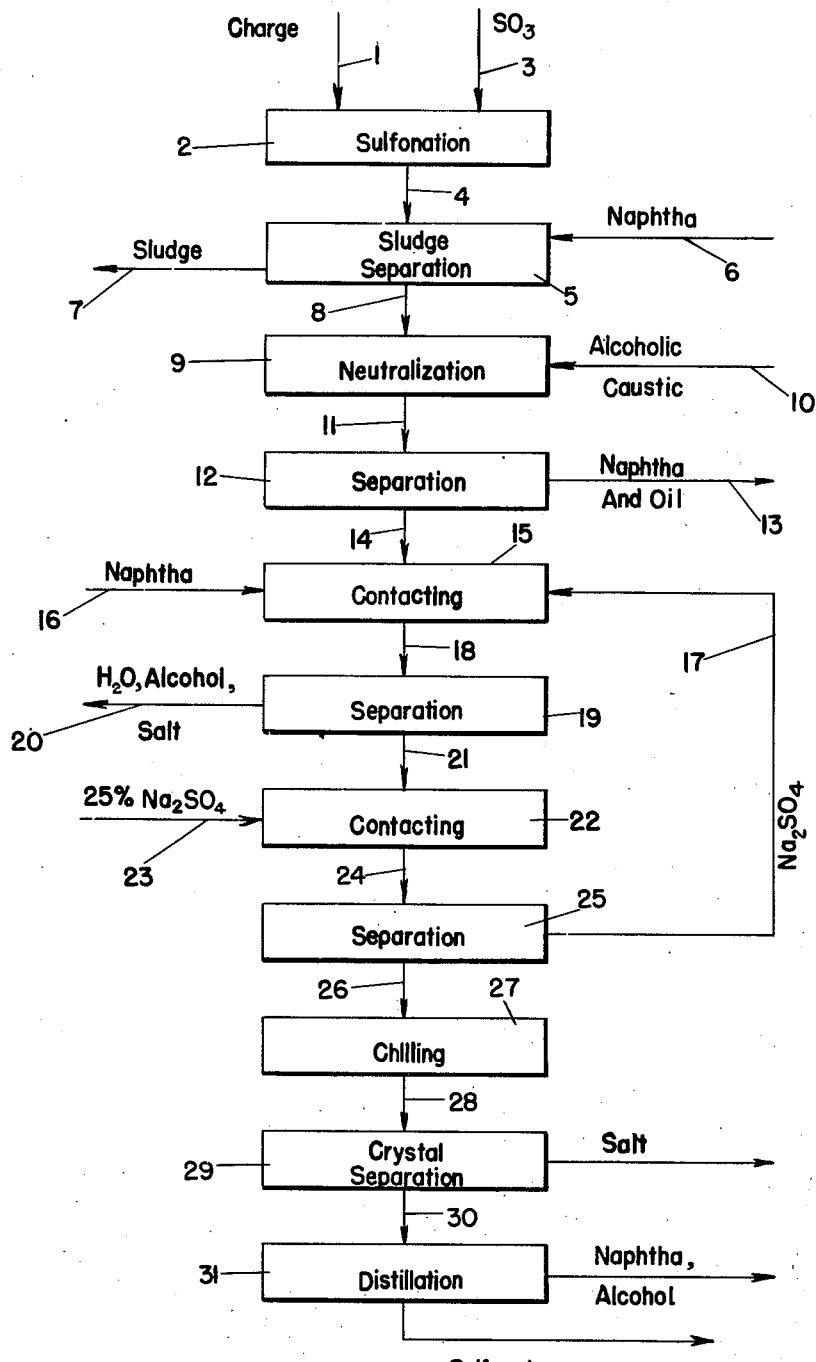

DESALTING SODIUM MAHOGANY SULFONATES

Evan E. Davis, Jr., Drexel Hill, and Willard K. Parcells, Chester, Pa., assignors to Sun Oil Company, Philadelphia, Pa., a corporation of New Jersey Application October 13, 1955, Serial No. 540,184

5 Claims. (Cl. 260—504)

This invention relates to a process for purifying sodium sulfonates, and more particularly to a method for removing inorganic salts from mahogany sulfonates.

A known commercial method for the manufacture of mahogany sulfonates involves contacting a solvent-refined lubricating oil or other petroleum fraction with sulfuric anhydride, concentrated sulfuric acid, or oleum, separating acid sludge from an oil layer comprising mahogany sulfonic acids and unreacted oil, treating the oil layer with naphtha and an aqueous alcoholic caustic solution and separating the mixture into an oil layer comprising naphtha and unreacted oil and an aqueous layer comprising alcohol, water, and sodium mahogany sulfonates. The alcohol and water may then be distilled from the aqueous layer to yield mahogany sulfonates as a bottoms product. The sulfonates produced in this process will, however, contain up to 12 percent or so inorganic salts formed by reaction of caustic with dissolved $SO_3$ or sulfuric acid. Such a salt content is undesirable when the sulfonates are to be used for purposes such as the manufacture of petroleum product additives. Attempts have been made in the past to lower the salt content of the sulfonate product by adding sodium chloride or anhydrous sodium carbonate to the aqueous sulfonate layer in order to salt out the sulfonates into a sulfonate layer, followed by removal of the salt layer and further processing of the sulfonate layer to remove alcohol and dissolved water. While claims have been made that such treatment will reduce the inorganic salt content of the sulfonates to 0.1 to 0.5%, so far as we are aware, such claims have not been realized in commercial practice.

It is an object of this invention to provide a commercial process for the manufacture of mahogany sulfonates containing less than about 0.5% inorganic salts.

It is a further object of this invention to provide a method for purifying commercial sodium mahogany sulfonates which contain an undesirably large amount of inorganic salts.

In accordance with our invention the aqueous alcoholic sulfonate solution, separated from the unreacted oil and naphtha layer as described above, is contacted with a second portion of naphtha, and with a sodium sulfate solution, which may be a fresh solution, or which may be obtained from a later step of the process. The naphtha serves as a solvent for the sulfonates, which are salted out of the aqueous alcoholic layer by the sulfate solution. After contacting, the mixture is allowed to settle, and an upper oil layer, comprised of sulfonates and naphtha, together with a small amount of inorganic salts, water, and alcohol, is separated from the water layer. In the oil layer, the inorganic salt and water will be present in about the same proportions as they occur in the aqueous layer. Generally speaking, the salt will be about 20% or less of the total of salt and water.

The recovered oil layer is then contacted with a second portion of sodium sulfate solution of 25–30% strength. After settling, an upper oil layer is recovered for further processing, and the water layer is returned to the process in the first contacting step. The oil layer again comprises naphtha and sulfonates, together with a small amount of inorganic salt, water, and alcohol, the salt and water being present in about the same proportions as they occur in the water layer. In this case, however, the salt will be about 25% or more of the total of salt and water. Now, if the oil layer is chilled, it will be found that the inorganic salts will crystallize out of solution as readily filterable hydrated crystals. The crystals may then be filtered from the oil, and the naphtha and alcohol may be distilled from the sulfonates, which are recovered essentially free from inorganic salt contaminants.

In order that those skilled in the art may more fully comprehend the nature of my invention and the method for carrying it out, it will be more fully described in connection with the accompanying drawing which is a diagrammatic flow sheet of the process.

In a typical operation, charge oil, which may be a solvent refined lubricating oil, or other petroleum fraction is passed through line 1 to sulfonation reactor 2, in which it is contacted with sulfur trioxide, sulfuric acid of at least 93% strength, or oleum, admitted through line 3, in a manner well known to the art. From reactor 2, the sour oil is passed through line 4 to acid sludge separation zone 5 in which it is contacted with naphtha introduced through line 6. Sludge is removed via line 7, and the sludge-free naphtha solution of oil and sulfonates is passed through line 8 to neutralizer 9, in which it is contacted with an alcoholic caustic solution introduced through line 10, in an amount in slight excess of that required to neutralize the sulfonic acids and unreacted $SO_3$ or sulfuric acid contained in the sour oils. The mixture is then taken through line 11 to separation zone 12 in which it is allowed to settle into an upper layer comprising naphtha and unreacted oil, and a lower layer comprising sodium sulfonates, water, alcohol, and dissolved inorganic salts, chiefly sodium sulfite and sodium sulfate. The upper layer is removed through line 13 for further processing to recover naphtha and oil, and the lower layer is taken through line 14 to a second contacting zone 15.

In zone 15 the lower layer is mixed with from one-half to two volumes of naphtha introduced through line 16, and with an aqueous sodium sulfate stream recovered via line 17 from a later step of the process. The mixture is then transported via line 18 to separation zone 19 in which it is allowed to separate into two layers, an upper phase comprising naphtha, sodium sulfonates and alcohol, together with a small amount of inorganic salts and water, and a lower layer of dilute aqueous sodium sulfate solution and some alcohol. This latter layer is taken off through line 20 for processing to recover alcohol and to concentrate the sodium sulfate solution. The upper phase will at this point contain inorganic salts and water in about the same proportion as they are found in the lower layer, which is usually less than about 20% sodium sulfate by weight.

The sulfonate phase is conducted through line 21 to contacting zone 22 in which it is mixed with from one-half to one volume of a concentrated solution of sodium sulfate (25–30% depending on the temperature at which the process is operated), introduced therein through line 23. From zone 22 the mixture is taken through line 24 to separation zone 25 in which it is settled into an upper sulfonate layer and a lower layer of sodium sulfate solution. The lower layer is recycled to the process through line 17 to contacting zone 15. The sulfonate layer will comprise sulfonates, naphtha, and alcohol, and will in addition still contain an appreciable amount of inorganic salts and water. The ratio of salts to water will have been changed, however, by treatment with the concentrated sodium sulfate solution, so that now the ratio of salt to water in the sulfonate layer is approximately 1:3.

The sulfonate layer is now taken from separation zone 25 and is passed through line 26 to chiller 27, in which its temperature is preferably reduced to approximately 32° F. At this temperature substantially all the inorganic salts will crystallize out as easily filterable crystals. The sulfonate-crystal slurry is then passed through line 28 to crystal separator 29, which may be a filter, a centrifuge, or a settling tank in which the inorganic salt crystals are removed. The salt-free sulfonate-naphtha-alcohol mixture is then passed through line 30 to a distillation column 31 in which naphtha and alcohol are taken overhead and salt-free sulfonates are recovered as bottoms.

As stated above, the temperature of the sulfonates is preferably reduced to 32° F., since at this temperature substantially complete removal of inorganic salts is obtained. In those instances where it is not requisite that the final product be entirely salt free, it is not necessary that the sulfonates be cooled to such a low temperature. For example, in treating a sulfonate layer from separation zone 25 which contained about 1–5% inorganic salts, based on the sulfonates present, the following results were obtained by filtration at various temperatures.

Table I

| Temperature at Filtration | Inorganic Salt Content of Product, Percent |
| --- | --- |
| 70° F | 0.96 |
| 50° F | 0.41 |
| 35° F | 0.11 |
| 32° F | 0.00 |

In the operation of our new process, two conditions appear to be essential. First, that the water content of the sulfonate solution, prior to chilling, must be reduced to a point such that the weight ratio of water to inorganic salt is of the order of 3:1, since if there is more water present the salt will not crystallize at reasonable temperatures. Second, there apparently must be an organic polar solvent present in the sulfonate solution at the time of chilling. For example, in processing a commercial sample of sulfonates containing about 12½% of inorganic salts, the sulfonates were dissolved in naphtha, were contacted with a 25% sodium sulfate solution, separated from the solution, and chilled to 32° F. No crystallization was obtained, and the sulfonates, after filtration and separation from naphtha, still contained about 12½% inorganic salts. When the same commercial sulfonates were dissolved in ether or isopropyl alcohol, and thereafter processed in the same manner, crystallization occurred on chilling, and salt-free sulfonates were recovered from the filtered sulfonate solution.

As described above in connection with the drawing, naphtha is introduced into contacting zone 15 to act as a solvent for the sulfonate salted out of the aqueous phase from separator 12 by contact with the sodium sulfate solution introduced through line 17. Use of naphtha is not essential in this step however, since any solvent for sulfonates may be used which is substantially immiscible with the sodium sulfate solution, such as isopropyl alcohol, ether, acetone, and the like. Naphtha is preferred, however, since it is cheaper and more easily handled than other solvents.

A sodium sulfite solution may also be used in place of the sodium sulfate solution. However, the sulfate solution is preferred, since somewhat lower chilling temperatures are required to effect substantially complete crystallization of salts when sulfite is used.

While the drawing shows a complete process for the production of salt-free sodium sulfonates from a charge oil, our invention is also adapted to purify finished sodium sulfonates containing undesirable amounts of inorganic salts. In this case the sulfonates may be dissolved in a solvent comprising an oxygenated hydrocarbon, such as ether, alcohol, or acetone, preferably in admixture with naphtha, and introduced directly to contacting zone 22, in which it is contacted with a 25% to 30% aqueous solution of sodium sulfate. After separation from the sulfate solution, the sulfonates may be passed through the ensuing steps of the process to yield a substantially salt-free product.

The invention claimed is:

1. A process for producing sodium sulfonate low in inorganic salt content which comprises contacting an inorganic salt contaminated solution of sodium mahogany sulfonates in a solvent comprising naphtha and a polar oxygenated hydrocarbon with a saturated aqueous solution of a salt selected from the group consisting of sodium sulfate and sodium sulfite, separating the sulfonate solution from the aqueous solution, chilling the sulfonate solution to a temperature favorable to crystallization of its inorganic salt content, separating crystals from the sulfonate solution, separating solvent from the sulfonates, and recovering sodium sulfonates low in inorganic salt content.

2. The process according to claim 1 in which the salt solution is a 25% to 30% solution of sodium sulfate.

3. A process for producing sodium sulfonates low in inorganic salt content which comprises reacting a sulfonatable hydrocarbon oil with a reagent selected from the group consisting of sulfur trioxide and oleum, recovering a mixture of mahogany sulfonic acids and unreacted oil, contacting the mixture in a first contacting zone with naphtha and an aqueous alcoholic caustic solution in an amount sufficient to neutralize the acidic components of the mixture, recovering an aqueous layer comprising water, alcohol, sodium sulfonates and dissolved inorganic salts, contacting the aqueous layer in a second contacting zone with naphtha and a recycle aqueous salt solution of a material selected from the group consisting of sodium sulfate and sodium sulfite, recovering an oil layer comprising naphtha, sodium sulfonates, alcohol, inorganic salts, and water, contacting the oil layer in a third contacting zone with from one-half to one volume of a concentrated aqueous solution of a material selected from the group consisting of sodium sulfate and sodium sulfite, recovering an oil layer and an aqueous layer, recycling the aqueous layer to the second contacting zone, chilling the oil layer to a temperature favoring crystallization of its inorganic salt content, separating the oil layer from crystals, and subjecting said crystal-free liquid to distillation to recover sodium sulfonates low in inorganic salt content as a bottoms product.

4. The process according to claim 3 in which the salt solution used as the contacting agent in the third contacting zone is a 25% to 30% solution of sodium sulfate.

5. A method for recovering sodium sulfonates low in inorganic salt content which comprises contacting in a first contacting zone an inorganic salt contaminated aqueous alcoholic solution of sodium mahogany sulfonates with from one-half to twice its volume of naphtha and with a recycle aqueous solution comprising sodium sulfate recovered from a later stage of the process, recovering an oily product comprising naphtha, sodium mahogany sulfonate, and alcohol, together with a small amount of inorganic salts and water; contacting the oily product in a second contacting zone with from one-half to an equal volume of a 25% to 30% sodium sulfate solution, recovering an aqueous sodium sulfate solution and cycling it to the first contacting zone, recovering an oily product having approximately the same composition, except for lowered water content, as the oily product recovered from the first contacting zone, chilling the oily product recovered from the second contacting zone to a temperature favoring crystallization of its inorganic salt content, separating the oily product from salt crystals, subjecting the crystal-free product to distillation, and recovering as bottoms sodium mahogany sulfates containing less than 0.5% inorganic salts.

References Cited in the file of this patent

UNITED STATES PATENTS

| | | |
|---|---|---|
| 2,035,106 | Vesterdal et al. | Mar. 24, 1936 |
| 2,068,149 | Myers et al. | Jan. 19, 1937 |
| 2,497,152 | Cohen | Feb. 14, 1950 |